United States Patent
Humenansky et al.

(10) Patent No.: US 7,213,199 B2
(45) Date of Patent: May 1, 2007

(54) SPREADSHEET USER-INTERFACE FOR AN ENTERPRISE PLANNING SYSTEM HAVING MULTI-DIMENSIONAL DATA STORE

(75) Inventors: Brian Scott Humenansky, Hugo, MN (US); Michael Lyle Giles, Andover, MN (US); Leonard Roy Oppenheimer, Saint Paul, MN (US); Clarence Anthony Aschenbrener, Waconia, MN (US); Steven Richard Broshar, Minneapolis, MN (US)

(73) Assignee: Cognos Incorporated (CA)

( * ) Notice: Subject to any disclaimer, the term of this patent is extended or adjusted under 35 U.S.C. 154(b) by 327 days.

(21) Appl. No.: 10/965,321

(22) Filed: Oct. 14, 2004

(65) Prior Publication Data

US 2006/0015805 A1    Jan. 19, 2006

Related U.S. Application Data

(60) Provisional application No. 60/588,649, filed on Jul. 16, 2004.

(51) Int. Cl.
*G06F 17/21* (2006.01)
*G06F 17/24* (2006.01)

(52) U.S. Cl. .............. 715/503; 715/504; 715/520; 715/538; 705/1; 705/7

(58) Field of Classification Search ............. 715/503, 715/504, 520, 538; 705/1, 7
See application file for complete search history.

(56) References Cited

U.S. PATENT DOCUMENTS

| | | | |
|---|---|---|---|
| 5,172,313 A | 12/1992 | Schumacher | |
| 5,381,332 A | 1/1995 | Wood | |
| 5,406,477 A | 4/1995 | Harhen | |
| 5,461,699 A | 10/1995 | Arbabi et al. | |
| 5,524,253 A | 6/1996 | Pham et al. | |

(Continued)

FOREIGN PATENT DOCUMENTS

EP    0294187 A2    12/1988

(Continued)

OTHER PUBLICATIONS

Halvorson et al., "Microsoft Office XP Inside Out", 2001, Microsoft Press, pp. 660-664, 683, 705,735, 795, and 805.*

(Continued)

*Primary Examiner*—Stephen Hong
(74) *Attorney, Agent, or Firm*—Shumaker & Sieffert, P.A.

(57) ABSTRACT

A spreadsheet environment is utilized to interact with a multidimensional data store associated with the enterprise planning session. In general, a conventional spreadsheet application is extended to provide additional functionality for interacting with the multidimensional data store maintained by the enterprise planning system. Instances of the extended spreadsheet application execute on a client computing device, and present a user with a two-dimensional representation of a portion of the multidimensional data store. For example, the extended spreadsheet application may present user with a workbook that includes one or more worksheets within which the user may view and update his planning data. In this manner, the extended spreadsheet application functions as an interface between two-dimensional worksheets maintained by the computing devices and the multidimensional data store maintained by the enterprise planning system.

39 Claims, 13 Drawing Sheets

U.S. PATENT DOCUMENTS

| | | | |
|---|---|---|---|
| 5,774,868 A | 6/1998 | Cragun et al. | |
| 5,799,286 A | 8/1998 | Morgan et al. | |
| 5,974,395 A | 10/1999 | Bellini et al. | |
| 6,023,702 A | 2/2000 | Leisten et al. | |
| 6,067,525 A | 5/2000 | Johnson et al. | |
| 6,073,108 A | 6/2000 | Peterson | |
| 6,151,601 A | 11/2000 | Papierniak et al. | |
| 6,161,051 A | 12/2000 | Hafemann et al. | |
| 6,161,103 A | 12/2000 | Rauer et al. | |
| 6,169,534 B1 | 1/2001 | Raffel et al. | |
| 6,173,310 B1 | 1/2001 | Yost et al. | |
| 6,182,060 B1 | 1/2001 | Hedgcock et al. | |
| 6,385,301 B1 | 5/2002 | Nolting et al. | |
| 6,385,604 B1 | 5/2002 | Bakalash et al. | |
| 6,397,191 B1 | 5/2002 | Notani et al. | |
| 6,411,936 B1 | 6/2002 | Sanders | |
| 6,418,420 B1 | 7/2002 | DiGiorgio et al. | |
| 6,424,979 B1 | 7/2002 | Livingston et al. | |
| 6,430,539 B1 | 8/2002 | Lazarus et al. | |
| 6,434,544 B1 | 8/2002 | Bakalash et al. | |
| 6,496,831 B1 | 12/2002 | Baulier et al. | |
| 6,622,056 B1 * | 9/2003 | Lindell | 700/106 |
| 6,687,713 B2 | 2/2004 | Mattson et al. | |
| 6,707,454 B1 | 3/2004 | Barg et al. | |
| 6,750,864 B1 | 6/2004 | Anwar | |
| 6,768,995 B2 * | 7/2004 | Thier et al. | 707/100 |
| 7,072,822 B2 * | 7/2006 | Humenansky et al. | 703/22 |
| 7,111,007 B2 * | 9/2006 | Thier et al. | 707/100 |
| 2001/0027455 A1 | 10/2001 | Abulleil et al. | |
| 2002/0042755 A1 | 4/2002 | Kumar et al. | |
| 2002/0049701 A1 | 4/2002 | Nabe et al. | |
| 2002/0082892 A1 | 6/2002 | Raffel et al. | |
| 2002/0087523 A1 | 7/2002 | Sivaraman | |
| 2002/0129003 A1 | 9/2002 | Bakalash et al. | |
| 2002/0143755 A1 | 10/2002 | Wynblatt et al. | |
| 2002/0169658 A1 * | 11/2002 | Adler | 705/10 |
| 2003/0078831 A1 * | 4/2003 | Kuettner et al. | 705/10 |
| 2003/0084053 A1 | 5/2003 | Govrin et al. | |
| 2003/0144894 A1 | 7/2003 | Robertson et al. | |
| 2004/0045014 A1 | 3/2004 | Radhakrishnan | |
| 2004/0064348 A1 * | 4/2004 | Humenansky et al. | 705/7 |
| 2004/0064349 A1 * | 4/2004 | Humenansky et al. | 705/7 |
| 2004/0064433 A1 * | 4/2004 | Thier et al. | 707/1 |
| 2004/0128185 A1 | 7/2004 | Tsai | |
| 2004/0138942 A1 * | 7/2004 | Pearson et al. | 705/10 |
| 2004/0143470 A1 | 7/2004 | Myrick et al. | |

FOREIGN PATENT DOCUMENTS

| | | |
|---|---|---|
| WO | WO 96/30852 | 10/1996 |

OTHER PUBLICATIONS

MacKay Neural Computation, 1992, 4(3): 415-447.
MacKay Neural Computation, 1992, 4(3): 448-472.
MacKay Neural Computation, 1992, 4(5): 720-735.
"Microsoft Press Computer Dictionary," 1997, Microsoft Press, Third Edition, p. 130.
Adaytum Software, www.adaytum.co.uk, Apr. 2, 1998 [retrieved Dec. 20, 2004], pp. 1-25, retrieved from Google.com and archive.org.

* cited by examiner

SPREADSHEET USER-INTERFACE FOR AN ENTERPRISE PLANNING SYSTEM HAVING MULTI-DIMENSIONAL DATA STORE

This application claims the benefit of U.S. Provisional Application Ser. No. 60/588,649, filed Jul. 16, 2004, the entire content of which is incorporated herein by reference.

TECHNICAL FIELD

The invention relates to computer-implemented techniques for enterprise business planning.

BACKGROUND

Enterprises often engage in business planning activities. Examples of enterprise planning activities for which accuracy is critical include budget planning, revenue forecasting, inventory management, resource planning, and the like. Enterprise business planning, however, is a difficult and expensive task that often produces inaccurate results.

Conventionally, enterprises have taken either a "top-down" or a "bottom-up" approach to enterprise planning. Bottom-up planning involves the aggregation of low-level forecasts from the lowest cost centers of an organization. For budget planning, for example, management personnel may be required to periodically forecast expenses, and allocate the expenses to a number of categories, such as advertisement, travel, and salaries. However, the bottom-up forecasts rarely, if ever, reconcile with top-down business targets. In top-down planning, enterprises identify fundamental business targets, such as average product price, cost per employee, and the like, and push the targets down through the hierarchical structure of the enterprise. However, in performing top-down planning, large, diverse enterprises may develop planning models that do not fit the needs of all the business units of the enterprise.

SUMMARY

In general, the invention is directed to enterprise planning techniques that improve the accuracy and predictability of budget planning within large organizations by enabling organizations to reconcile corporate financial models and organizational targets with detailed forecasts in real-time. In particular, the techniques make use of an enterprise planning database system having a transactional data area for real-time interaction with enterprise users, and a relational data area for detailed statistical analysis and report generation.

According to the techniques, an enterprise planning system enables and automates the reconciliation of top-down targets with detailed bottom-up forecasts for an enterprise. Generally, the enterprise planning system provides three stages of enterprise planning: (1) a modeling stage, (2) a contribution stage, and (3) a reconciliation stage. During the modeling stage, high-level enterprise managers or executives, referred to as analysts, define organizational targets, and build planning models for the enterprise. Next, during the contribution phase, a set of defined contributors interacts with the enterprise planning system and provides detailed forecasts in the form of contribution data. The enterprise planning system stores the contribution data within a multidimensional data store, e.g., one or more multi-dimensional data cubes. During the reconciliation phase, the enterprise planning system automates the reconciliation of the forecast data stored within the multidimensional data store with the organizational targets.

During this process, the enterprise planning system operates in accordance with the defined model to provide a hierarchical planning process having multiple reconciliation levels. At each level, the enterprise planning system presents the contribution data to enterprise reviewers, as defined by the hierarchical model, and requires that the reviewer reconcile the target data with the forecast data. Each reviewer may, for example, reject or accept the contribution data in view of corporate targets provided by the analysts.

As the contributors provide the contribution data, the enterprise planning system automatically aggregates the contribution data within the multidimensional data store across the enterprise in real-time, and presents the aggregated data to reviewers for acceptance or rejection. This process continues until the contribution data is ultimately approved by the reviewers associated with the highest level of the organizational hierarchy, thereby ensuring that the contribution data from the contributors reconciles with corporate targets.

As will be described, a computing device associated with an enterprise user presents a user interface to allow the user to interact with a multidimensional data store associated with the enterprise planning session in a spreadsheet environment. In general, a conventional spreadsheet application is extended as described herein to provide functionality for interacting with the multidimensional data store maintained by the enterprise planning system. Particularly, instances of the extended spreadsheet application execute on the computing device, and present the user with a two-dimensional representation of a portion of the multidimensional data store. For example, the extended spreadsheet application may present user with a workbook that includes one or more worksheets. In this manner, the extended spreadsheet application functions as an interface between two-dimensional worksheets maintained by the computing devices and the multidimensional data store maintained by the enterprise planning system.

The enterprise planning system may utilize a "cut-down" process by which the multidimensional data store is "sliced" for each user in accordance with the defined enterprise model. During this process, enterprise planning system identifies areas of the defined model to which the user is assigned, either as a contributor or a reviewer, and "slices" the data store based on the assignment. When a given user logs in and proceeds with an enterprise planning activity, the enterprise planning system communicates the respective data slice to the respective computing device for display to the user via the extended spreadsheet application.

The extended spreadsheet application allows the user to format multi-dimensional data for display within a worksheet, thereby taking advantage of the functionality provided by the spreadsheet application. For example, the spreadsheet application may structure and present the worksheet to the user with "zones" of control. In one embodiment, the worksheet presented by the extended spreadsheet application may partition a worksheet into multiple zones. A first zone may include data cells associated with conventional worksheet data. These data cells may be viewed as storing or referencing "local" data maintained within the worksheet. A second zone may include data cells for presenting the multidimensional data received from the enterprise planning system. The extended spreadsheet application may display the zones to the user using visual cues, such as cell shading or text color. Moreover, the extended spreadsheet application controls the zones to ensure the integrity of the multi-dimensional data maintained by the enterprise planning system.

As described in further detail below, the extended spreadsheet application allows the user to manipulate the spreadsheet application to control the retrieval of data stored within the multidimensional data store of the enterprise planning system. In particular, the extended spreadsheet application supports a form of absolute referencing, i.e., specifying a particular location along a dimension of the data store for his or her specific "slice" of the data store, and a form of indirect referencing, i.e., specifying a particular location within a dimension of the data store without regard to a particular model slice, i.e., without regard to a particular node. As a result, a worksheet template, for example, may be created using the indirect reference functionality, and exchanged between different enterprise users. Due to the use of indirect reference functions supported by the extended spreadsheet application, the data received from the enterprise planning system and presented by the template varies based on the particular node associated with the current workbook.

In addition, the extended spreadsheet application provides functionality by which the user may create spreadsheets that utilize input formulas to populate one or more of the multidimensional data cells in addition to conventional spreadsheet output formulas. The input formula entered into the formula toolbar may reference conventional data cells within the workbook, other spreadsheet workbooks, a third party system or other external data sources. Moreover, the user may embed the formulas within worksheets, such that the extended spreadsheet application ensures the integrity of the data maintained by enterprise planning system.

In one embodiment, a method comprises downloading multidimensional data and at least a portion of an enterprise planning model from a multidimensional data store maintained by an enterprise planning system, generating a spreadsheet for presenting the downloaded multidimensional data in accordance with the downloaded portion of the enterprise planning model, and displaying the spreadsheet and the multidimensional data to a user with a spreadsheet application.

In another embodiment, a system comprises an enterprise planning system that maintains multidimensional data associated with an enterprise planning session in accordance with an enterprise model, and a computing device coupled to the enterprise planning system via a network. A spreadsheet application executing on the computing device comprises an engine that communicates with the enterprise planning session and loads a portion of the multidimensional data and at least a portion of the enterprise planning model on the computing device, and a document management module that provides a structured representation of a spreadsheet based on the downloaded portion of the enterprise planning model for presenting the downloaded portion of the multidimensional data to a user.

In another embodiment, a computer-readable medium comprises instructions that cause a processor of a computing device to download multidimensional data and at least a portion of an enterprise planning model from a multidimensional data store maintained by an enterprise planning system, generate a spreadsheet for presenting the downloaded multidimensional data in accordance with the downloaded portion of the enterprise planning model, and display the spreadsheet and the multidimensional data to a user with a spreadsheet application.

The techniques described herein may improve the accuracy and predictability of enterprise planning by enabling organizations to reconcile corporate models and organizational targets with detailed forecasts in real-time. The techniques may provide a platform that delivers collaborative, real-time planning capabilities, without requiring offline consolidation and aggregation of forecasts. Because the enterprise planning system can aggregate contribution data in real-time, all users can be presented with an accurate, up-to-date view of the numbers. The system provides rapid response regardless of the number of enterprise users involved in the planning, thus providing precise planning information.

Further, the architecture described herein can readily scale to thousands of users, and may be designed around best planning practices. In this manner, the system may used to centrally manage all planning information across operating units and systems within the enterprise, thus creating a "planning hub." Consequently, users can work from a single pool of planning data, and can be assured of the integrity of the data.

In addition, the techniques promote high user-participation across the enterprise, allowing planning cycles to be reduced, e.g., from months to weeks, and best practices, like rolling forecasting, to be quickly enabled.

Moreover, the spreadsheet interface presented by the enterprise planning system allows users to leverage existing spreadsheet functionality, e.g., formatting, graphing, and other functions, while interacting with a complex, multidimensional data store.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 8–13 illustrate a number of views presented by a spreadsheet application during an exemplary enterprise planning session.

DETAILED DESCRIPTION

Figure 1:
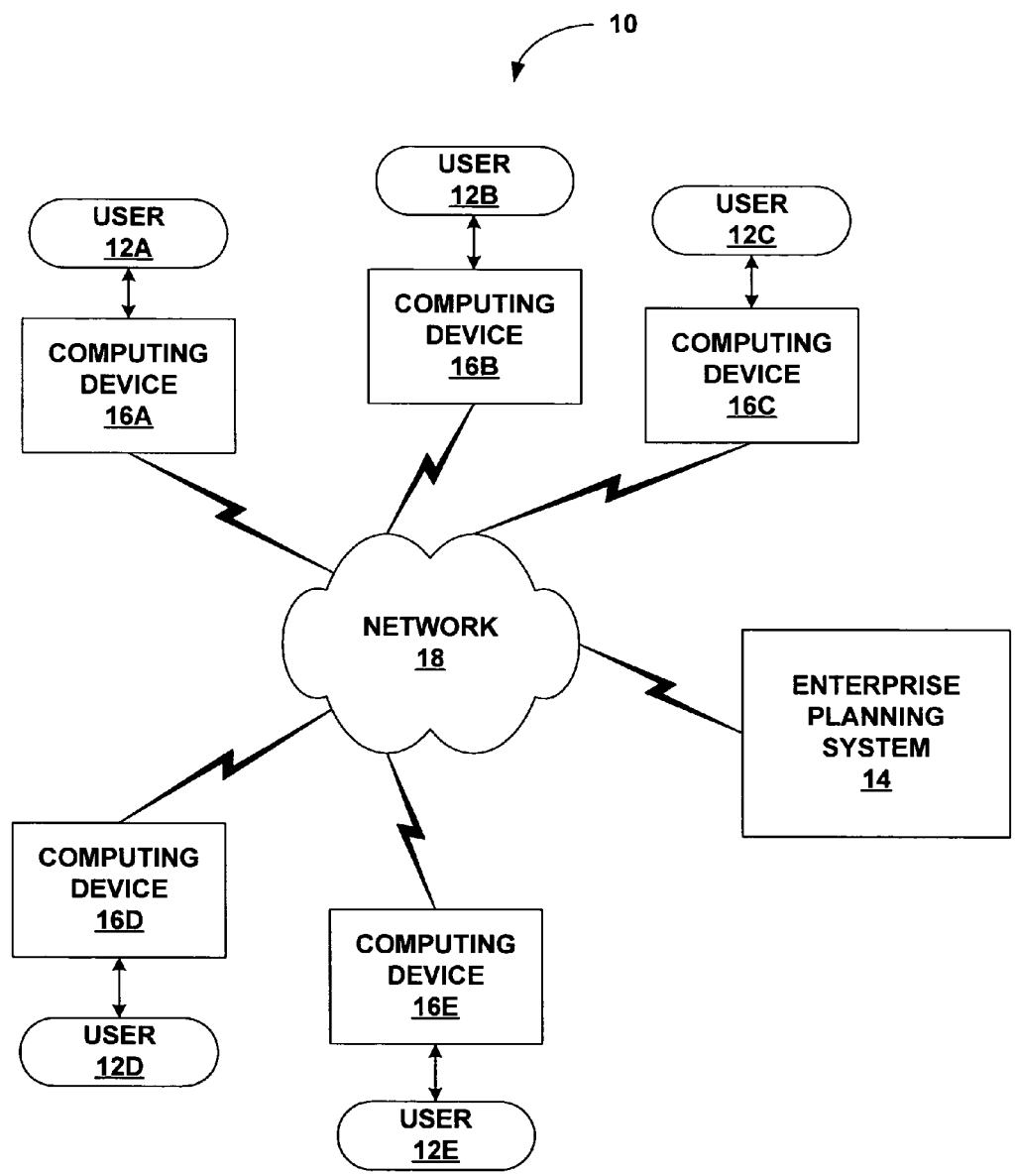
FIG. 1 is a block diagram illustrating an environment in which an enterprise planning system enables and automates the reconciliation of top-down targets with detailed bottom-up forecasts.

FIG. 1 is a block diagram illustrating a system 10 that allows users 12A–12E (collectively, "users 12") to interact with an enterprise planning system 14 in accordance with the techniques of invention. In the system shown in FIG. 1, enterprise planning system 14 is communicatively coupled to a number of computing devices 16A–16E (collectively, "computing devices 16") by a network 18. Users 12 interact with their respective computing devices to access enterprise planning system 14 throughout the planning process.

Generally, the enterprise planning process can be divided into three stages: (1) a modeling stage, (2) a contribution stage and (3) a reconciliation stage. In the modeling stage, high-level enterprise managers or executives, referred to as analysts, define organizational targets, and build planning models for the enterprise. The analysts may include, for example, financial analysts, such as the chief financial officer, senior financial analysts or product and sales analysts. More specifically, the analysts develop a model having a number of hierarchically arranged nodes representing various cost centers within the organization, such as business units or departments.

During the modeling stage, the analysts also establish corporate targets for each node of the organizational hierarchy. The analysts then assign one or more enterprise users to each node, such as managers, supervisors, sales representatives, lab managers, or the like, that are responsible for enterprise planning for the cost center corresponding to the node. Each enterprise user may be designated as a contributor that provides planning data to enterprise planning system 14, a reviewer that accepts or rejects contributions from the contributors, or both. The contributors and reviewers may be authorized users within the enterprise or within other entities coupled to network 18, such as suppliers or customers.

Finally, the analysts may define a number of templates for collecting enterprise forecast data from the contributors. In one example, the analysts may define the templates using a spreadsheet application as described in detail below. The analysts include corporate target data in the templates or references to the corporate target data to facilitate reconciliation with the forecast data. Corporate target and forecast data may include financial data, revenue data, order data, inventory data, and the like, depending on the particular enterprise planning activity being carried out by the enterprise.

Next, enterprise planning system 14 enters the contribution phase during which enterprise users 12 that are designated as contributors interact with enterprise planning system 14 via the spreadsheet application to input detailed forecasts in the form of contribution data. As described above, enterprise users 12 may provide detailed financial forecasts, revenue forecasts, order forecasts, inventory forecasts, estimated resource requirements, and the like, depending on the particular enterprise planning activity being carried out by the enterprise.

During the reconciliation phase, enterprise planning system 14 automates the reconciliation of the forecast data with the corporate target data provided by the analysts. In particular, enterprise planning system 14 operates in accordance with a defined model, i.e., the enterprise planning model created by the analysts, to provide a hierarchical planning process having multiple reconciliation levels. As each of the contributors provides his or her contribution data, enterprise planning system 14 automatically aggregates the contribution data across the enterprise in real-time, and provides access to the aggregated data to enterprise users 12 designated as reviewers associated with higher levels of the enterprise. In particular, upon receiving contribution data from the contributors, enterprise planning system 14 identifies all higher levels of the organizational model affected by the newly received contribution data, and calculates new aggregate totals at each level in real-time.

Consequently, the reviewers view aggregated data across the enterprise in real-time during the enterprise planning session. As will be described, the reviewers may view the aggregated data using the extended spreadsheet application described in detail below. At each level, enterprise planning system 14 ensures that the reviewers, as defined by the nodes of the enterprise model, reconcile the target data with the forecast data. Each of the reviewers may, for example, reject or accept the contribution data in view of corporate targets provided by the analysts. This process continues until the contribution data is ultimately approved by the highest level of the organizational hierarchy, thereby ensuring that the contribution data from the contributors reconciles with corporate targets provided by the analysts.

In this manner, enterprise planning system 14 may provide more accurate enterprise planning than with conventional techniques. For example, enterprise planning system 14 may improve the accuracy and predictability of enterprise planning by enabling organizations to reconcile corporate models and organizational targets with detailed forecasts. The techniques may provide a platform that delivers collaborative, real-time planning capabilities, without requiring offline consolidation and aggregation of forecasts. Because enterprise planning system 14 can aggregate contribution data in real-time, all users 12 can be presented with an accurate, up-to-date view of the numbers. Further, the architecture of enterprise planning system 14 can readily scale to thousands of users, and may be designed around best planning practices. In addition, the techniques enabling high participation by enterprise users 12, i.e., the contributors and reviewers, allowing accurate planning cycles to be reduced Enterprise users 12 may use a variety of computing devices to interact with enterprise planning system 14 via network 18. For example, an enterprise user may interact with enterprise planning system 14 using a laptop computer, desktop computer, or the like, running a web browser, such as Internet Explorer™ from Microsoft Corporation of Redmond, Wash. Alternatively, an enterprise user may use a personal digital assistant (PDA), such as a Palm™ organizer from Palm Inc. of Santa Clara, Calif., a web-enabled cellular phone, or similar device.

Network 18 represents any communication network, such as a packet-based digital network like the Internet. In this manner, system 10 can readily scale to suit large enterprises. Enterprise users 12 may directly access enterprise planning system 14 via a local area network, or may remotely access enterprise planning system 14 via a virtual private network, remote dial-up, or similar remote access communication mechanism.

As will be described in detail herein, computing devices 16 provide users 12 with a user interface to allow the users to interact with a multidimensional data store associated with the enterprise planning session in a spreadsheet environment. In general, a conventional spreadsheet application is extended as described herein to provide functionality for interacting with the multidimensional data store maintained by enterprise planning system 14. Particularly, instances of the extended spreadsheet application execute on computing devices 16, and present users 12 with a two-dimensional representation of a portion of the multidimensional data store. For example, the extended spreadsheet application may present user 12 with a workbook that includes one or more worksheets. Each worksheet may correspond to a different "slice" of the multidimensional data store, as described in further detail below. In this manner, the extended spreadsheet application functions as an interface between two-dimensional worksheets maintained by computing devices 16 and the multidimensional data store maintained by enterprise planning system 14. The multidimensional data store contains one or more data cubes associated with different aspects of the planning process. For example, enterprise planning system 14 may maintain a first data cube associated with an income statement and a second data cube associated with an expense sheet.

Users 12 may interact with computing devices 16 to utilize the extended spreadsheet application in all phases of the planning process. For example, analysts may use the extended spreadsheet application to define templates for contributors and/or reviewers. Furthermore, contributors and reviewers may use the extended functionality of the spreadsheet application to view and edit contribution data associated with the enterprise planning session.

For example, in one embodiment, the extended spreadsheet application includes a main menu associated with the enterprise planning session, and a new toolbar to aid users 12 in the enterprise planning session. The main menu and toolbars present user 12 with functionality for engaging in the planning session. For example, the functionality presented on the main menu items and toolbars allow users 12 to log into enterprise planning system 14.

Enterprise planning system 14 may utilize a "cut-down" process by which the multidimensional data store is "sliced" for each user 12 in accordance with the defined enterprise model. During this process, enterprise planning system 14 identifies areas of the defined model to which users 12 are assigned, either as contributors or reviewers, and "slices" the data store based on the assignments. When a given user 12 logs in and proceeds with an enterprise planning activity, enterprise planning system 14 communicates the respective data slice to the respective computing device 16 for display to the user via the extended spreadsheet application. In this fashion, enterprise planning system 14 need not communicate the entire model to each of users 12, thereby reducing communication time as well as resource requirements. Instead, each user 12 receives only relevant information. Users 12 interact with the extended spreadsheet application to capture contribution data, and to reconcile the contribution data with organizational targets.

The extended spreadsheet application allows users 12 to format multi-dimensional data for display within a worksheet, thereby taking advantage of the functionality provided by the spreadsheet application. For example, the spreadsheet application may structure and present the worksheet to users 12 with "zones" of control. In one embodiment, the worksheet presented by the extended spreadsheet application may partition a worksheet into multiple zones. A first zone may include data cells associated with conventional worksheet data. These data cells may be viewed as storing or referencing "local" data maintained within the worksheet. A second zone may include data cells for presenting the multidimensional data received from enterprise planning system 14. The extended spreadsheet application may display the zones to the user using visual cues, such as cell shading or text color. Moreover, the extended spreadsheet application controls the zones to ensure the integrity of the multidimensional data maintained by the enterprise planning system 14.

As described in further detail below, the extended spreadsheet application allows users 12 to manipulate the spreadsheet application to reference data stored within the multidimensional data store of enterprise planning system 14. In particular, the extended spreadsheet application supports a form of absolute referencing and a form of indirect referencing.

The absolute referencing functionality allows a particular one of users 12 to specify a particular location along a dimension of the data store for his or her specific "slice" of the data store. More specifically, the absolute reference functionality supported by the extended spreadsheet application allows a user 12 to interact with a spreadsheet and specify that a given data cell references a specific location along a dimension of the data slice associated with that particular user. As a result, extended spreadsheet application displays only the data associated with that particular user 12 within the worksheet data cell.

In contrast, the indirect referencing functionality supported by the extended spreadsheet application allows a user 12 to specify a particular location within a dimension of the data store without regard to a particular model slice, i.e., without regard to a particular node. In other words, a particular multidimensional data cell within the workbook may reference a location along a dimension of a data cube maintained by enterprise planning system 14, but does not associate the cell with a particular node. As a result, a worksheet template, for example, may be created using the indirect reference functionality, and used with different nodes. For example, a user may utilize the template to create workbooks for manipulating data associated different nodes for which the user is authorized. As another example, the user may exchange the template with other users 12 for use by the users to work with data associated with nodes to which they are authorized. Due to the use of indirect reference functions supported by the extended spreadsheet application, the data received from enterprise planning system 14 and presented by the template varies based on the particular node associated with the one of users 12 using the template. In this manner, formulas and graphs may be created and shared between users 12, and the extended spreadsheet application automatically displays the correct data for the respective nodes.

In addition, the extended spreadsheet application provides functionality by which users 12 may create spreadsheets that utilize input formulas to populate one or more of the multidimensional data cells in addition to conventional spreadsheet output formulas. For example, in one embodiment, the extended spreadsheet application provides a formula toolbar by which users 12 enter formulas in one of the multidimensional data cells. The formula entered into the formula toolbar may reference conventional data cells within the workbook, other spreadsheet workbooks, a third party system or other data sources to import data into enterprise planning system 14. Moreover, users 12 may embed the formulas within worksheets, such that the extended spreadsheet application ensures the integrity of the data maintained by enterprise planning system 14.

Figure 2:
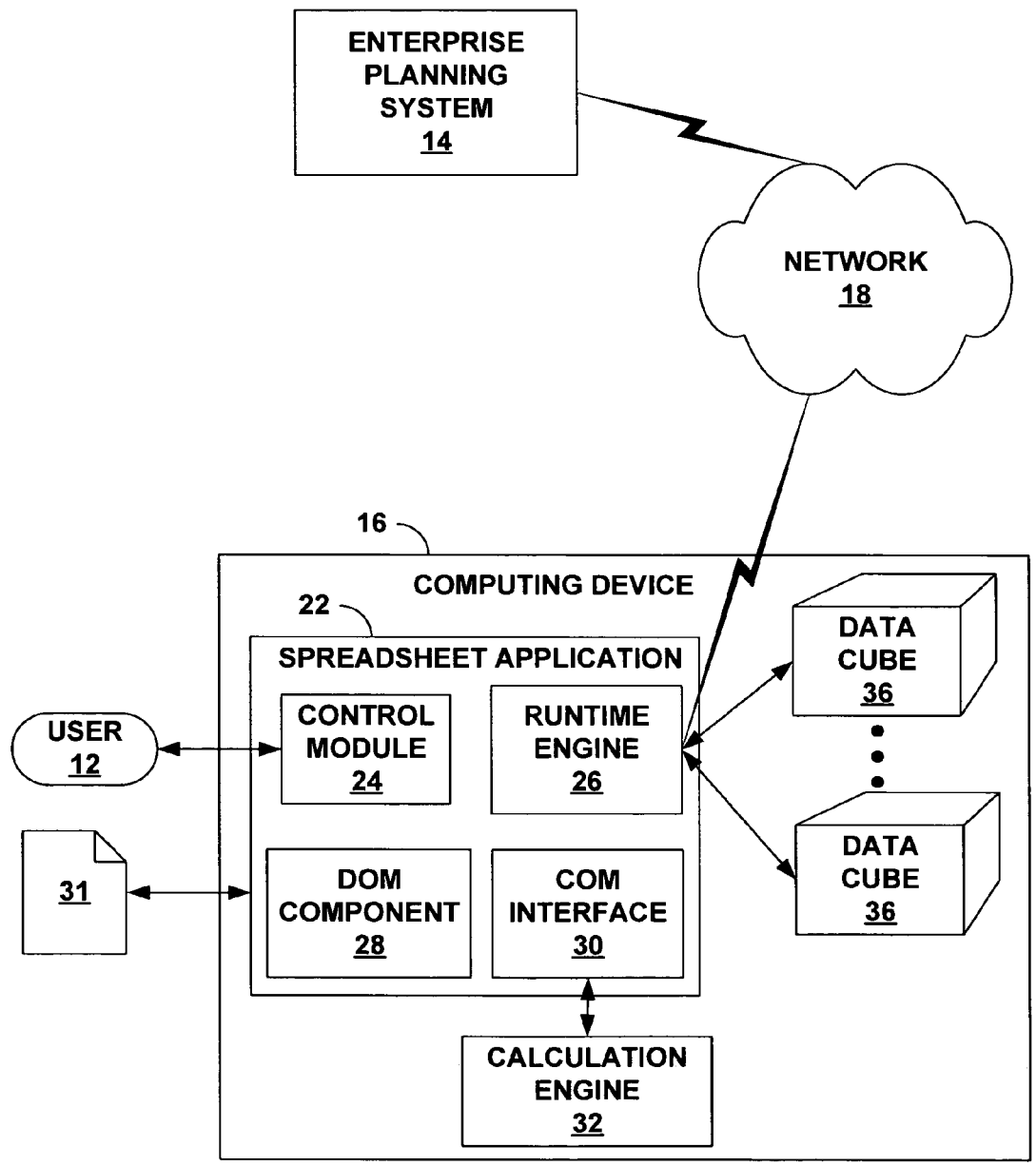
FIG. 2 is a block diagram illustrating one embodiment of a remote computing device for interacting with the system.

FIG. 2 is a block diagram illustrating an example embodiment of one of computing devices 16 in further detail. In the illustrated embodiment, computing device 16 includes a spreadsheet application 22. Spreadsheet application 22 represents any conventional spreadsheet data analysis software application, such as Microsoft Excel™ provided by Microsoft Corporation, Quattro™ Pro of Corel and Lotus 1-2-3™ of IBM. The invention will be described herein with respect to Microsoft Excel for exemplary purposes. In accordance with the invention, the functionality of spreadsheet application 22 is extended as described herein to provide user 12 with the capability to view and edit multi-dimensional data, e.g., data located within a multidimensional data store maintained by enterprise planning system 14, in an electronic worksheet environment. This allows user 12 to leverage existing spreadsheet functionality, e.g., formatting, graphing, and other functions, while interacting with a complex, multidimensional data store.

Spreadsheet application 22 includes a control module 24, a runtime engine 26, a Document Object Module (DOM) component 28, and a COM interface 30, which may comprise instructions executable by a processor. Control module 24 may be, for example, a software module that spreadsheet application 22 loads or otherwise invokes upon being launched by user 12. Control module 24 contains software code, such as Visual Basic for Applications (VBA) code, which adds additional functionality to spreadsheet application 22 to provide the conventional electronic worksheet environment with additional functionality for allowing user 12 to view and manipulate data of a multidimensional data store in a two-dimensional environment. In this manner, control module 24 extends the functionality of spreadsheet application 22 to provide an interface between a two-dimensional worksheet environment and the multidimensional data store maintained by enterprise planning system 14.

Runtime engine 26 encapsulates communications with a web server associated with enterprise planning system 14 and, in one embodiment, is a set of Component Object Model (COM) components. Runtime engine 26 may, for example, in response to a command from control module 24, negotiate with the web server associated with enterprise planning system 14, log user 12 into enterprise planning system 14, retrieve data from the multidimensional data store, and perform other operations with respect to enterprise planning system 14. In one embodiment, for example, runtime engine 26 may communicate with the web server associated with enterprise planning system 14 via Hypertext Transfer Protocol (HTTP).

Document object model (DOM) component 28 is a document management module that provides a structured representation of the elements of a spreadsheet workbook 31. In particular, DOM component 28 provides a structured, object-oriented representation of individual elements and content in spreadsheet workbook 31 with methods for retrieving and setting the properties of those objects. DOM component 28 also provides methods for adding and removing such objects.

Upon user 12 opening spreadsheet application 22, spreadsheet application 22 loads control module 24 to provide the extended functionality described herein. Control module 24 may, for example, add one or more user-defined main menu items associated with the enterprise planning session, one or more user-defined toolbars to aid users 12 for engaging in the enterprise planning session, or other user-defined items for interacting with the multidimensional data store maintained by enterprise planning system 14. In one embodiment, control module 24 adds a main menu item that includes sub-items, such as a "log on" sub-item that allows user 12 to log onto enterprise planning system 14. Alternatively, or in addition, control module 24 adds toolbars that provide user 12 with buttons for engaging the additional functionality of spreadsheet application 24. The buttons of the new toolbars may include, for example, buttons for taking a node of the enterprise planning session offline, bringing the node back online, choosing the dimensions of a worksheet of workbook 31, and the like.

User 12 initially selects to log onto enterprise planning system 14 via the "log on" sub-item of the new main menu item associated with the enterprise planning session. Spreadsheet application 22 may require user 12 to enter identification information, such as a username and password. Control module 24 commands runtime engine 26 to negotiate with the web server and log user 12 into enterprise planning system 14 using the identification information input by user 12. In this manner, control module 24 utilizes runtime engine 26 to communicate with enterprise planning system 14. Control module 24 may further command runtime engine 26 to download calculation engine 32 and one or more data cubes 36 from enterprise planning system 14.

Calculation engine 32 is a forward calculation engine wrapped in an Active X control built in an array-based language. Data cubes 36 are a "slice" of the multidimensional data store maintained by enterprise planning system 14 and associated with user 12. In particular, data cubes 36 contain target data and forecast data for areas of the defined planning model to which user 12 is assigned. As a result, the slice of the multidimensional data store downloaded by spreadsheet application 22 changes depending on the identity of user 12 using spreadsheet application 22.

Spreadsheet application 22 may store data cube 36 locally such that all calculations can be performed locally within computing device 16. Therefore, after the download is complete, user 12 is able to view and modify the forecast data within spreadsheet application 22 and communicate with calculation engine 32 via COM interface 30 to perform calculations without accessing enterprise planning system 14. In this manner, user 12 can work "offline," and will only experience network delays when data cube 36 is initially downloaded, as well as when an updated data cube is saved at the end of a session. Alternatively, spreadsheet application 22 may not download data cubes 36, but instead access the slice of the multidimensional data store associated with user 12 via network 18.

When creating a new "planning-enabled" worksheet, spreadsheet application 22 provides user 12 with a list of nodes that are available for user 12 to access. User 12 may create one or more spreadsheet workbooks for each node in the enterprise planning model to which the user has access. Each workbook is associated with only one node, but multiple workbooks may be created for each node of the enterprise planning model.

Each of the workbooks includes one or more worksheets. A portion of the worksheets are visible worksheets with which user 12 may interact to view and manipulate data. Each of the visible worksheets corresponds to a different one of data cubes 36. Particularly, each of the worksheets provides a view into its respective data cube in accordance with the cube dimensions specified by user 12. In addition to the one or more visible worksheets, the workbooks also maintain one or more worksheets that are hidden from user 12. These hidden worksheets exist to maintain view-dependent information, such formatting information and input formulas for multidimensional data cells.

After user 12 selects one of the spreadsheet workbooks from the list, spreadsheet application 22 presents the selected spreadsheet workbook to user 12. In the example illustrated in FIG. 2, spreadsheet application 22 displays spreadsheet workbook 31 to user 12. Spreadsheet workbook 31 is a two-dimensional representation of a portion of the multidimensional data store associated with user 12, e.g., data cube 36.

In particular, spreadsheet application 22, with the aid of document object model (DOM) component 28, structures spreadsheet workbook 31 and populates worksheets of spreadsheet workbook 31 with data. The data may be a combination of conventional worksheet data maintained within spreadsheet workbook 31 and data maintained in data cube 36. Spreadsheet application 22 populates conventional worksheet data cells with "local" data maintained within the worksheet.

Spreadsheet application 22 populates multidimensional data cells, i.e., data cells that reference the remote multidimensional data store, using the referencing techniques briefly described above. In particular, spreadsheet application populates multidimensional data cells that use absolute referencing with the user's data from the specified model slice containing the user's data. In this case, spreadsheet application 22 retrieves the appropriate data from the specified model slice within the multidimensional data store maintained by enterprise planning system 14.

Spreadsheet application 22 populates multidimensional data cells that use indirect referencing with the data located along a dimension of the data slice associated with user 12. Spreadsheet application may, for example, retrieve the information for populating such data cells from data cube 36, which is stored locally within computing device 16. As such, the data presented to the user for multidimensional data cells using indirect referencing varies based on the particular node currently being accessed by the workbook.

As briefly mentioned above, spreadsheet application provides functionality by which workbooks may utilize input formulas to populate one or more of the multidimensional data cells. The input formulas override the data populated via the referencing techniques described above. Upon populating each of the multidimensional data cells, control module 24 accesses the hidden pages of workbook 31 to determine whether there exists an input formula associated with the multidimensional data cell. If not, spreadsheet application 22 populates the multidimensional data cell in accordance with the referencing techniques described above. If, however, control module 24 identifies an input formula associated with the multidimensional data cell, control module 24 executes the input formula and populates the multidimensional data cell with the result of the input formula. As described above, the input formula may reference conventional data cells within spreadsheet workbook 31, other spreadsheet workbooks, a third party system, or the like, as input values for variables of the formula. For example, the formula may reference as one if its variables an inventory management system. In one embodiment, the input formulas of workbook 31 are not executed until a command to execute the formulas is input by user 12.

In one exemplary implementation, spreadsheet application 22 structures and presents worksheets of workbook 31 to user 12 with "zones." For example, DOM component 28 may structure the worksheets into a first zone that includes data cells associated with conventional worksheet data, e.g., the data maintained within workbook 31, and a second zone that includes data cells associated with multidimensional data received from enterprise planning session 14. DOM component 28 may display the zones to user 12 using visual cues. For example, the data cells within the second zone, i.e., the zone associated with the multidimensional data, may have gray backgrounds while the data cells of the first zone have plain white back grounds. Alternatively, or in addition, other visual cues may be used to distinguish the zones from one another, such as a text color or border associated with the data cells.

Additionally, control module 24 may control the zones to insure integrity of the multidimensional data of data cube 36. To achieve this, control module 24 may maintain a set of control rules for controlling user interaction with the data cells within each of the zones. In addition, the control rules may specify the manner in which spreadsheet application 22 reconciles model changes (e.g., dropped or added items). As one example, user 12 may not be able to manipulate information populated in a data cell by absolute referencing, e.g., target information input by an analyst.

Figure 3:
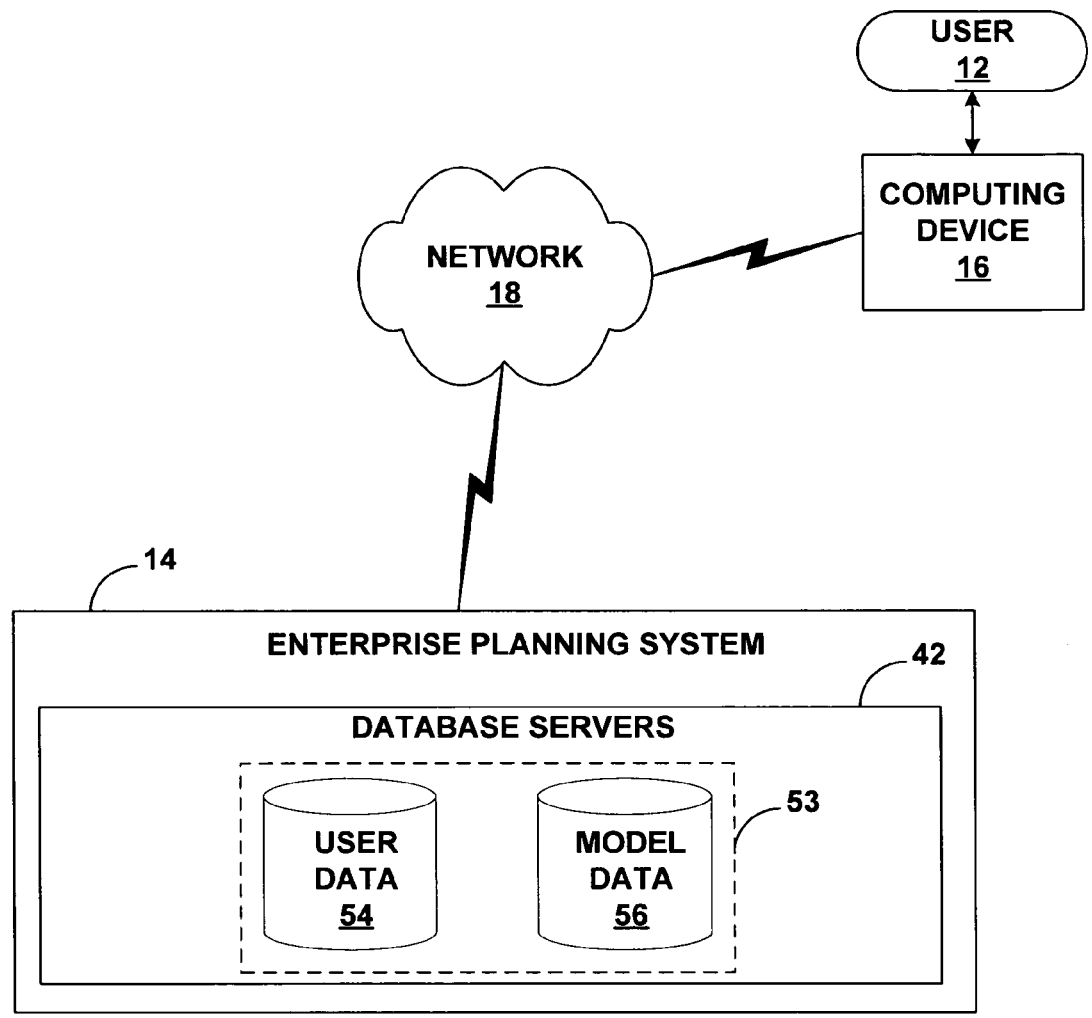
FIG. 3 is a block diagram illustrating one example embodiment of the enterprise planning system.

FIG. 3 is a block diagram illustrating an example of enterprise planning system 14. Enterprise planning system 14 includes a database server 42. Although described in terms of only a single database server, enterprise planning system 14 may include multiple database servers.

Computing device 16 interacts with database server 42 to access enterprise data 53, which includes user data 54 and model data 56. Enterprise data 53 may be stored in a number of different forms including one or more data storage files (e.g., data cubes), or one or more database management systems (DBMS) executing on one or more database servers. The database management systems may be a relational (RDBMS), hierarchical (HDBMS), multidimensional (MDBMS), object oriented (ODBMS or OODBMS) or object relational (ORDBMS) database management system. Furthermore, although illustrated separately, enterprise data 56 could be combined into a single database or other data storage structure. User data 54 and model data 56 could, for example, be implemented as a single relational database.

User data 54 stores information for each of enterprise users 12, including a name, an electronic mail (email) address, and other contact information. Model data 56 stores enterprise planning models defined by a set of analysts. Model data 56 may include, for example, information that defines a reconciliation process developed by the analysts, including a number of reconciliation levels, various nodes in an enterprise hierarchy, and enterprise users 12 associated with the nodes. In addition, model data 56 stores respective spreadsheet workbook templates for capturing contribution and review data from enterprise users 12.

Spreadsheet application 22 interacts with database server 42 to data from model data 56 needed to populate data cells within the workbook. For example, spreadsheet application 22 may interact with database server 42 to download data cubes 36 in the example embodiment described in FIG. 2.

Figure 4:
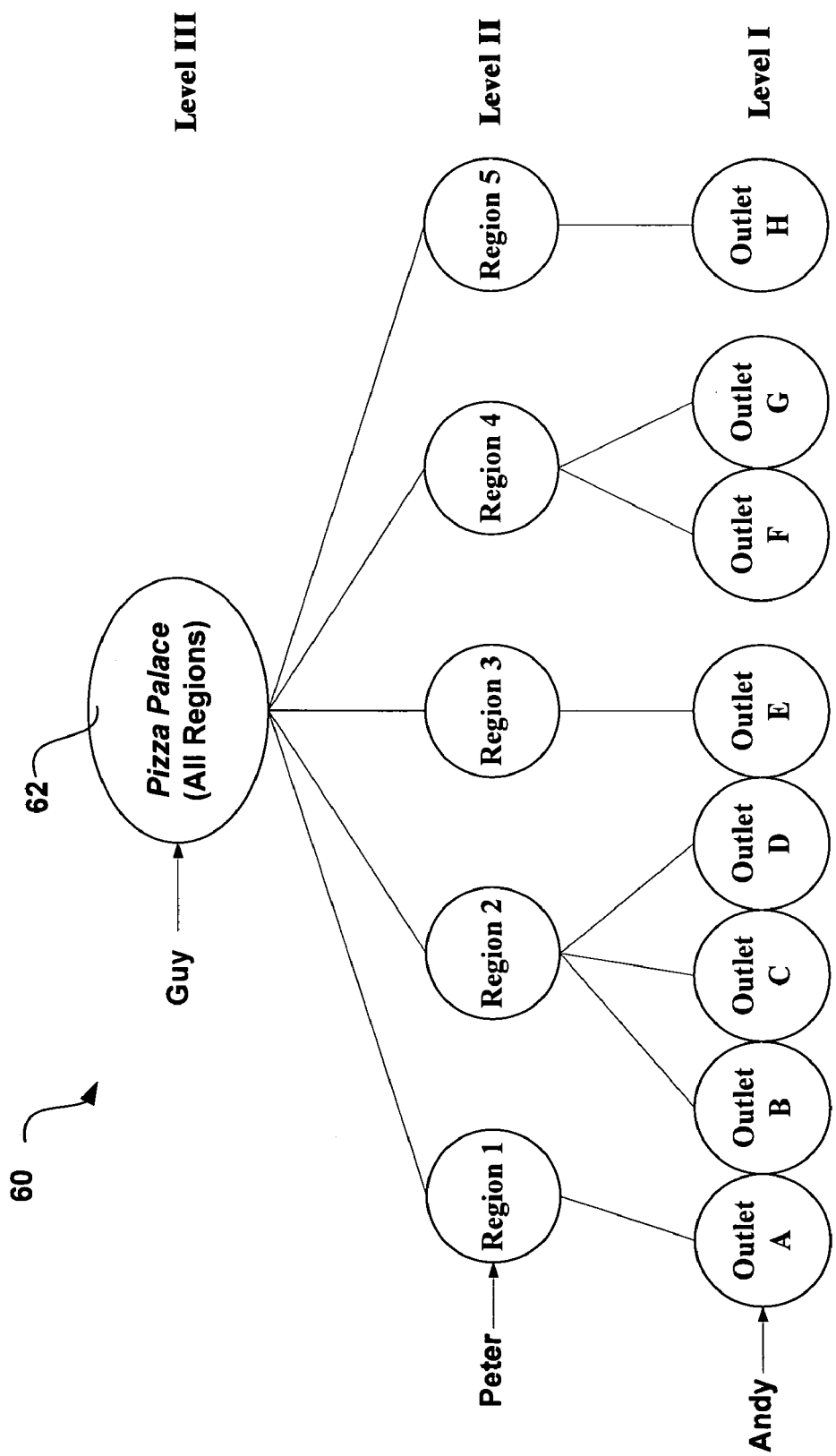
FIG. 4 is a diagram illustrating an example enterprise hierarchy of an enterprise used to create an enterprise planning model.

FIG. 4 is a schematic diagram illustrating an exemplary hierarchical enterprise planning model 60 for Pizza Palace, Inc., a fictitious pizza chain. Model 60 is horizontally organized around the various geographic regions occupied by the franchise, regions 1 through 5, and vertically organized into three reconciliation levels. Corporate goals and targets are set by the analysts and are distributed down through the various "nodes" of the hierarchy. The individual stores of the franchise, referred to as outlets, occupy the bottom level, Level I. Spending forecast data is received at the lowest level and reconciled with these targets at each level.

Each node corresponds to one or more users that are responsible for entering forecast data or reviewing the forecast data in view of the corporate targets. FIG. 4 illustrates three of the contributors: Guy, Peter and Andy. Guy is the Chief Financial Officer for Pizza Palace, Inc. and is responsible for the overseeing all regions. Guy, therefore, is listed as an "owner" of root node 62 and as a "reviewer" for all regions. Peter is a middle level manager charged with overseeing Region 1. As such, Peter is listed as the owner of Region 1 and reviewer for Outlet A. Andy, a manager of a local pizza store, is listed as the owner for Outlet A.

For each node of model 60, the corresponding users may associate one or more workbooks. For example, each outlet within Level I represents a different node, and is associated with one or more users. Each user may elect to associate one or more spreadsheet workbook with their respective model slices for capturing forecast information and carrying out the planning session. At Level II, each region is similarly associated with one or more users, which may create workbooks. Root node 62 of model 60 is similarly associated with a user (Guy), who may utilize one or more planning enabled workbooks as an interface for his planning session.

Figure 5:
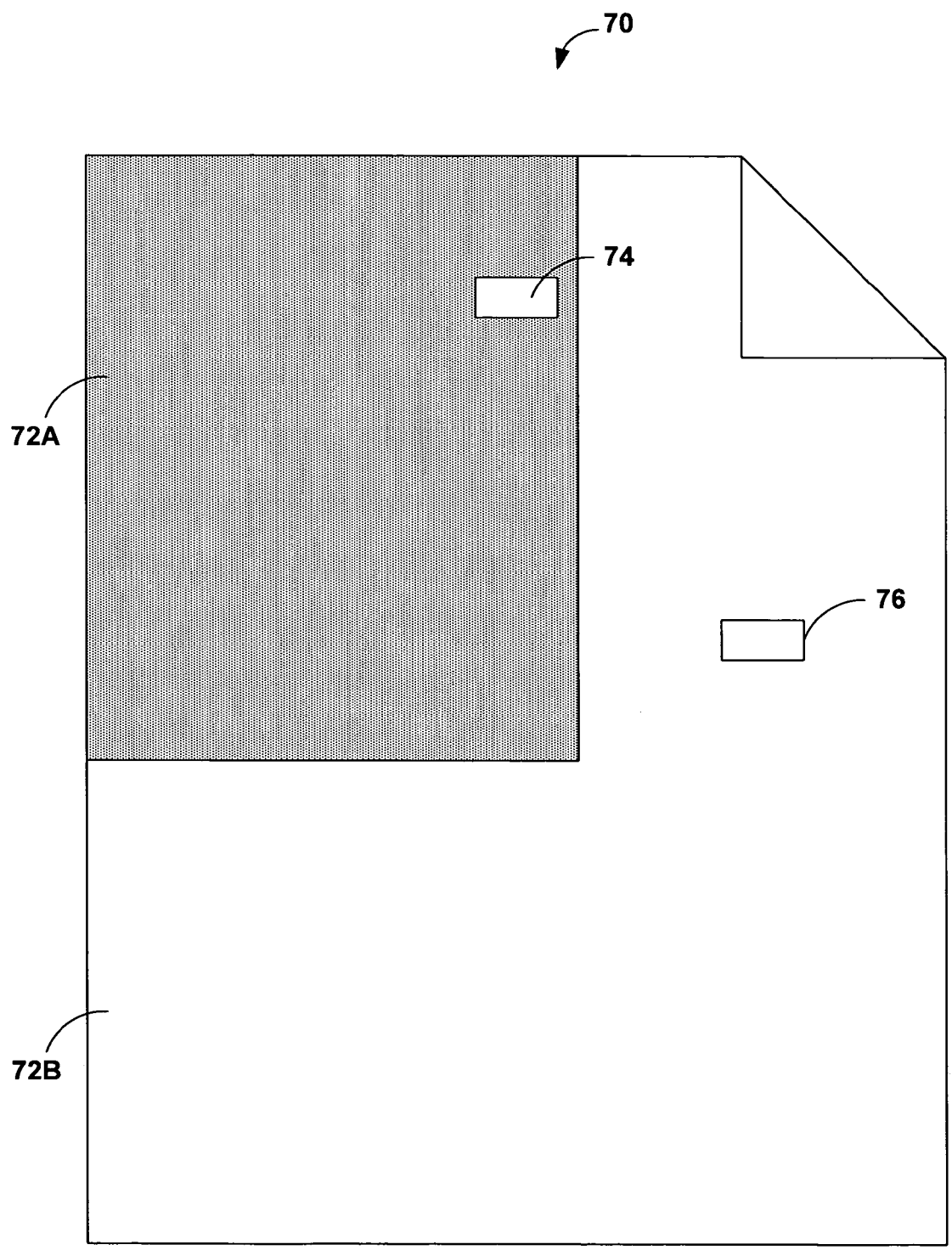
FIG. 5 is a block diagram illustrating an exemplary spreadsheet workbook presented to user with zones of control.

FIG. 5 is a block diagram illustrating an exemplary spreadsheet workbook 70 presented to user 12 with zones of control. In particular, spreadsheet workbook 70 includes a first zone 72A that includes at least on multidimensional data cell 74 and a second 72B that includes at least one conventional data cell 76. As described above, zones 72 may be displayed to user 12 using visual cues, such as shading, text color, and cell borders. In the example illustrated in FIG. 5, zone 72A is shaded gray while zone 72B remains white.

Spreadsheet application 22 may control zone 72A to insure integrity of the multidimensional data store associated with the workbook. For example, spreadsheet application may maintain a set of control rules for controlling user interaction with the multidimensional data cells within zone 72A and the manner in which spreadsheet application 22 reconciles model changes.

As a first example, spreadsheet application may control the types of referencing that data cell 74 supports. Spreadsheet application 22 may support multiple types of multidimensional data references in multidimensional data cell 74. For instance, multidimensional data cell 74 may include absolute or indirect references to data maintained by enterprise planning system 14, as described in detail above.

Additionally, multidimensional data cell 74 may include an input formula in accordance with the invention. The input formula may be stored on a hidden page within workbook 70 and may reference other data cells within workbook 70, other workbooks, third party systems or the like as values for variables of the formula. For example, the formula may reference as one if its variables an inventory management system.

Figure 6:
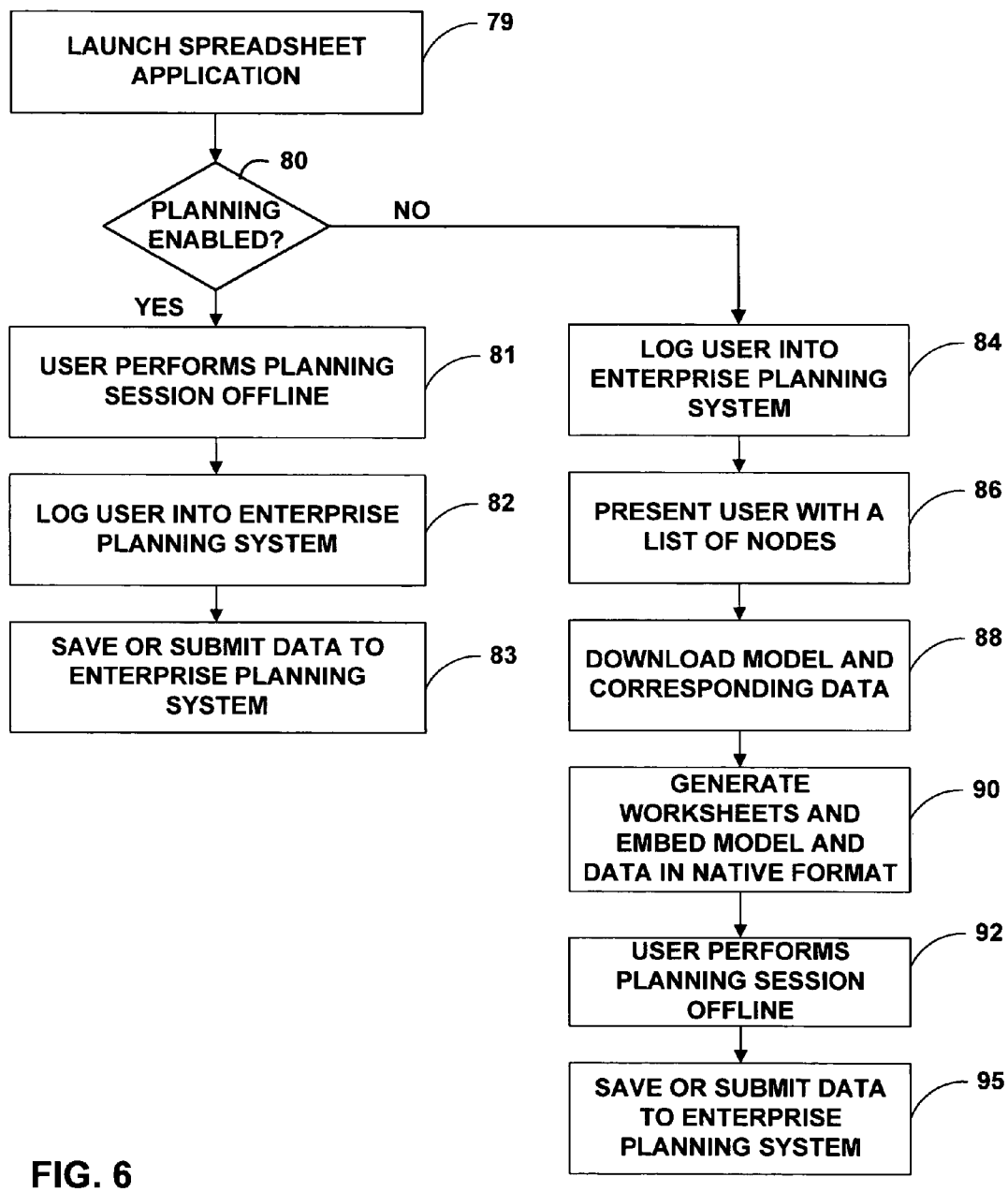
FIG. 6 is a flow diagram illustrating exemplary operation of an extended spreadsheet application providing a two-dimensional worksheet environment which a user can interact with to view and manipulate a multidimensional data store maintained by enterprise planning system.

FIG. 6 is a flow diagram illustrating exemplary operation of an extended spreadsheet application 22 providing a two-dimensional worksheet environment which a user 12 can interact with to view and manipulate a multidimensional data store maintained by enterprise planning system 14. Initially, user 12 opens spreadsheet application 22 (79). If user 12 opens a workbook that is already "planning enabled" (80), then the user is able to interact with the workbook to perform an enterprise planning session (81). For example, the user may interact with the workbook to enter or review contribution data for the node with which the workbook is associated. As referred to herein, a workbook is "planning enabled" in the sense that the spreadsheet workbook has been associated with a node of the enterprise planning model, and data defining the relevant portion of the model as well as the corresponding planning data has been embedded within the model within its native multidimensional format.

After user 12 is finished with her current planning session, the user may save her work locally (i.e., by saving the workbook itself), or may elect to log into enterprise planning system 12 (81) and save the data to the enterprise planning system (83). In this fashion, user 12 may synchronize the planning data within the workbook with the data stored by enterprise planning system 12 for the corresponding node. During this process, the user may also elect to "submit" the planning data, i.e., mark the data as read-only (locked) and ready for review.

If, however, the user launches the spreadsheet application and does not open a "planning enabled" workbook (79, 80), the user is able to select a "log on" sub-item from a main menu toolbar of the workbook. Spreadsheet application 22 receives the log on command from user 12, prompts user 12 for log on information, and logs user 12 into enterprise planning system 14 (84). Control module 24 may, for example, issue a command to runtime engine 26 to negotiate with a web server associated with enterprise planning system 14 and log user 12 into enterprise planning system 14 using the identification information input by user 12. As described above, runtime engine 26 may communicate with the web server via Hypertext Transfer Protocol (HTTP).

Upon logging user 12 into enterprise planning system 14, spreadsheet application 22 presents user 12 with a workflow dialog that lists possible nodes that the user may associate with the current workbook (86). As described above, a planning enabled spreadsheet workbook may be associated with a single node in the enterprise planning model (FIG. 5). Spreadsheet application 22 receives input from user 12 identifying a node, and downloads the corresponding model slice and data for the selected node (88). Spreadsheet application generates the appropriate worksheets within the workbook to embed the downloaded model slice and data to preserve its native, multidimensional format (90).

User 12 is then able to interact with the new workbook to perform an enterprise planning session (92). As described above, after user 12 is finished with her current planning session, the user may save her work locally, synchronize the planning data within the workbook with the data stored by enterprise planning system 12 for the corresponding node, and/or submit the planning data for review (95).

Figure 7:
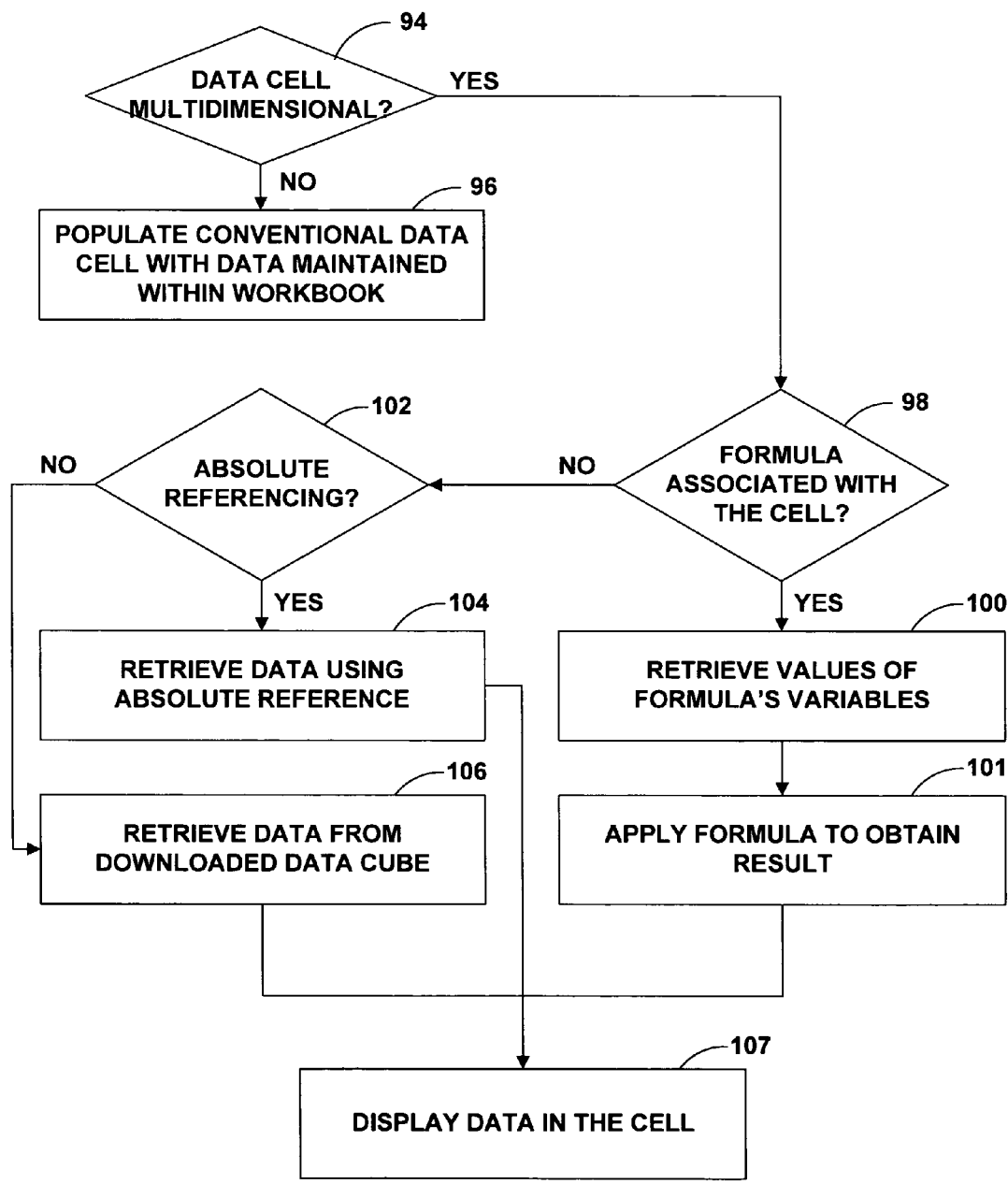
FIG. 7 is a flow diagram illustrating exemplary operation of an extended spreadsheet application populating each of the data cells of a workbook.

FIG. 7 is a flow diagram illustrating exemplary operation of spreadsheet application 22 populating each of the data cells of a workbook. Initially, spreadsheet application determines whether the data cell is a conventional data cell or a multidimensional data cell (96). Spreadsheet application 22 may determine the type of data cell based on the referencing. For example, spreadsheet application 22 may determine a data cell is a conventional spreadsheet data cell if the data cell references data stored within the worksheet. If the data cell is not a multidimensional data cell, spreadsheet application 22 populates the data cell with data maintained within the workbook (98).

If the data cell is a multidimensional data cell, however, spreadsheet application determines whether there is an input formula associated with the multidimensional data cell (100). Spreadsheet application 22 may, for example, access a hidden worksheet within which the input formulas are maintained and determine whether any of the formulas correspond to the particular data cell. If spreadsheet application 22 identifies a formula associated with the data cell, spreadsheet application and automatically retrieves values for the formula's variables (100) and applies the formula to obtain a result (101). Spreadsheet application may, for example, retrieve values for the variables of the formula from other data cells within the workbook, from data cells of other workbooks, from enterprise planning model 14, or from third party systems. Spreadsheet application 22 displays the result of the input formula in the data cell (107). In one embodiment, the formula is not calculated until the user commands spreadsheet application 22 to calculate the formula. In this case, the data cell may be populated using the techniques described next. As soon as the formula is calculated, however, the data becomes overridden with the result of the calculation.

If there is no input formula associated with the data cell, spreadsheet application 22 determines whether the data cell uses absolute referencing (102). If the data cell uses absolute referencing, spreadsheet application 22 retrieves the data using the absolute reference (104) and displays the data in the data cell (107). As described above, the absolute reference may point to a location of the data storage associated with a different node. In this case, spreadsheet application 22 may communicate with enterprise planning system 14 to retrieve the appropriate information. Alternatively, if the user is the one that made the absolute reference, the reference may point to his or her "slice" of the data store, which may be stored locally on his or her computing device 16.

If the data cell does not use absolute referencing, but instead uses indirect referencing, spreadsheet application 22 retrieves the data from the location along a dimension of the data store associated with the user (106) and displays the data in the data cell (107).

Figure 8:
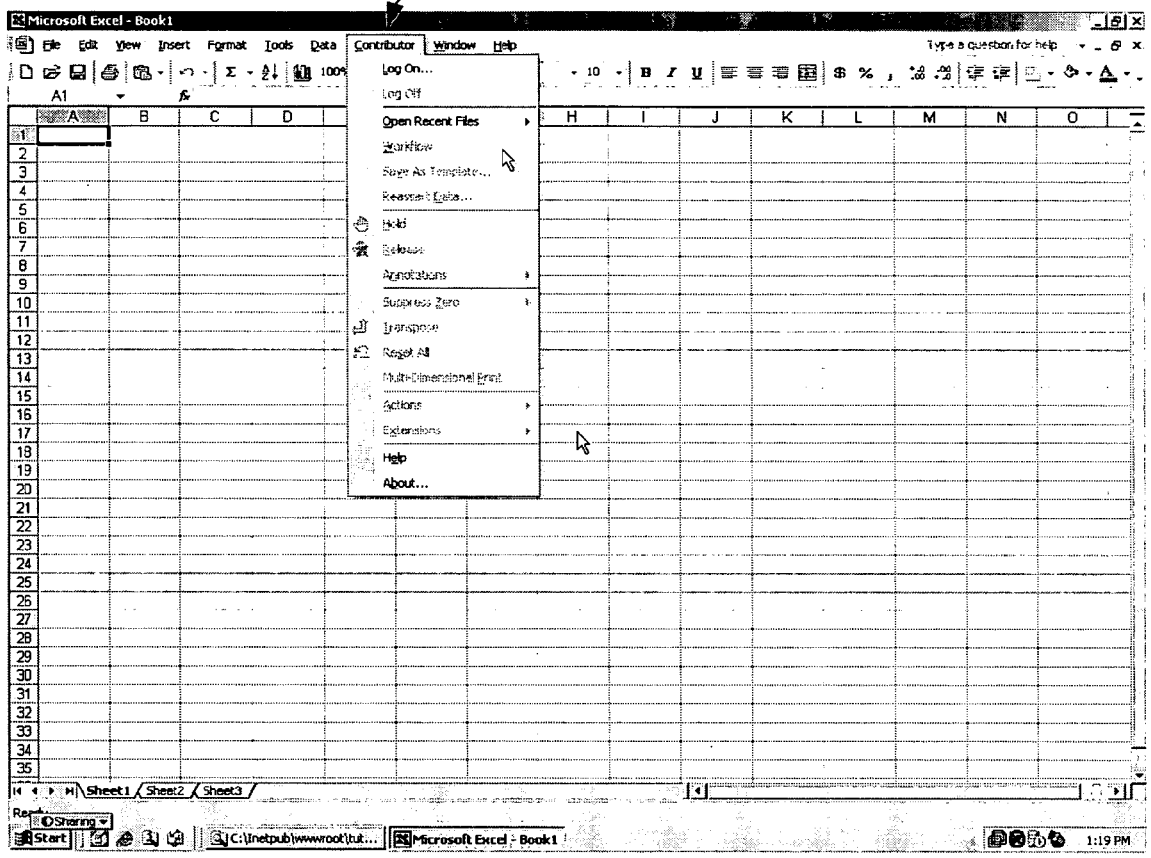

FIG. 8 is a screen shot of a user interface 108 presented to user 12 upon opening spreadsheet application 22. As illustrated in FIG. 8, a typical Excel user interface is extended to create user interface 108. Upon being opened by user 12, spreadsheet application 22 loads add-in 24 to extend the conventional functionality of Excel to provide the additional functionality described above. In particular, user interface 108 includes a new menu 109 in Excel's main menu. In the screen shot illustrated in FIG. 8, new menu 109 is inserted just to the right of the Data menu and is labeled "Contributor." New menu item 109 includes numerous sub-items including Log on, which allows user 12 to connect to enterprise planning system 12 using, for example, a username and password.

Figure 9:
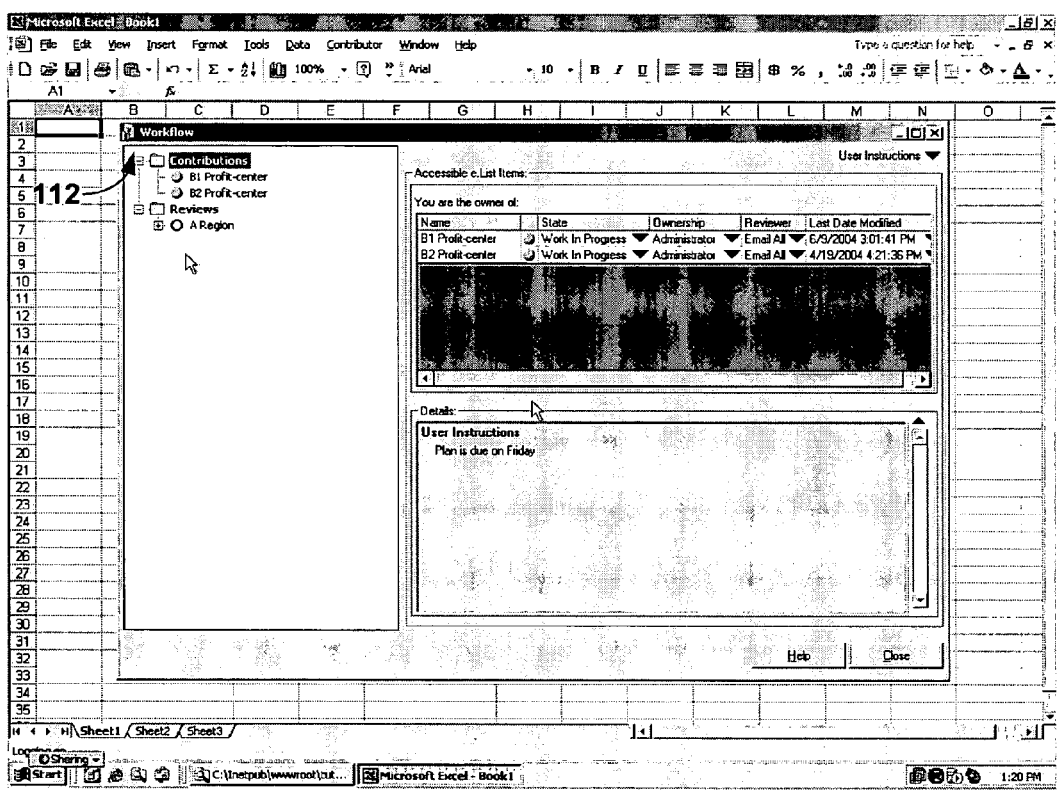

FIG. 9 is a screen shot of a user interface 110 presented to user 12 after logging into enterprise planning system 14. User interface 110 presents user 12 with a workflow diagram 112 that lists nodes that are accessible to user 12 as determined by enterprise planning system 12. In the example illustrated in FIG. 9, user 12 may access two nodes: B1 and B2. Nodes B1 and B2 are nodes within the enterprise planning model for which the user is authorized and, in this example, are associated with different profit centers. User 12 selects one of the nodes that can be loaded into the current spreadsheet workbook. Workflow diagram 112 may further include a details section that includes notes or instructions. In the example illustrated in FIG. 9, the details section includes a user instruction indicating that the plan is due on Friday.

Figure 10:
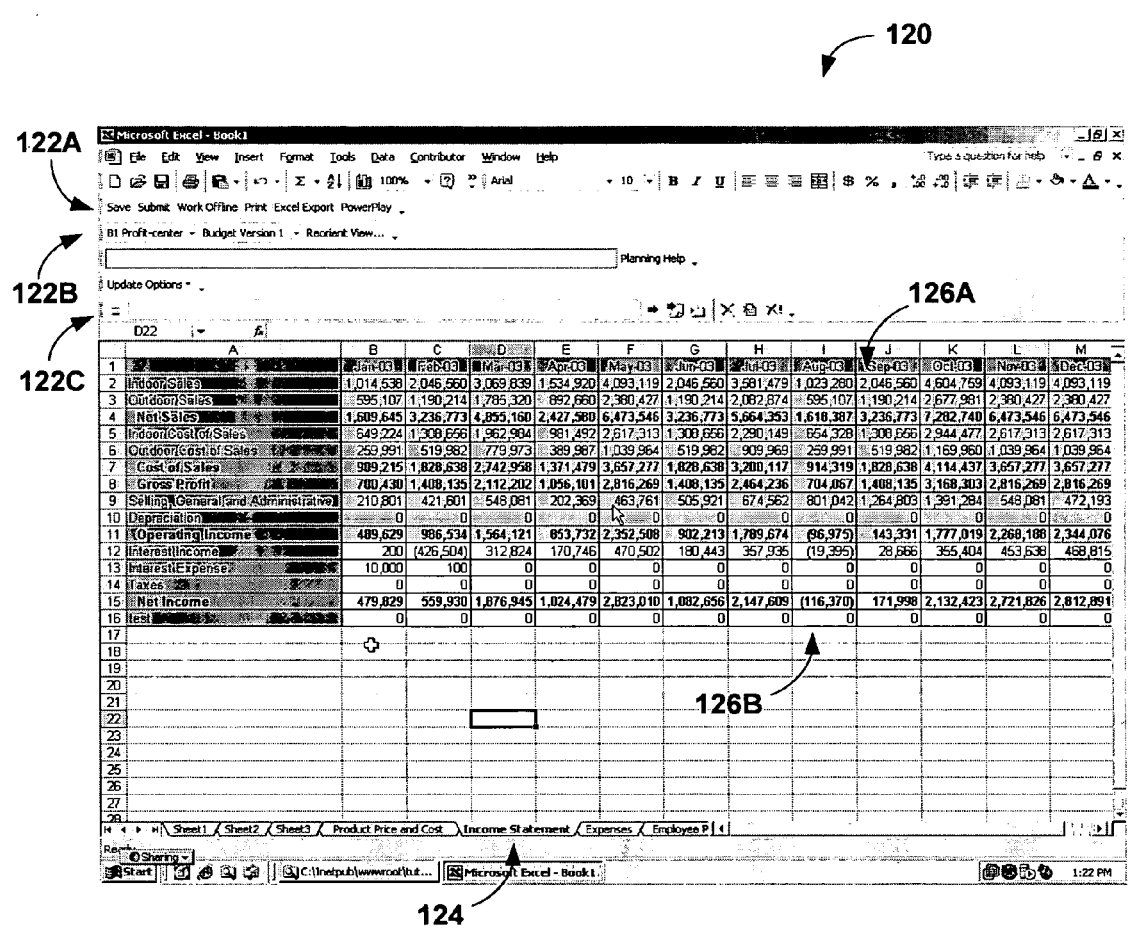

FIG. 10 is a screen shot of a user interface 120 presented to user 12 upon loading the selected node into the current workbook. User interface 120 presents an Excel workbook to user 12 for viewing and editing multidimensional data within data cube 36 of FIG. 2. User interface 120 includes new user-defined toolbars 122A–122C (collectively, "toolbars 122"). Toolbar 122A provides user 12 with a number of buttons for performing functions such as a "Save" button for saving the workbook locally and for saving the multidimensional data in the workbook back to enterprise planning system 14, a "Submit" button for submitting the multidimensional data to enterprise planning system 14 and locking the multidimensional data for review, a "Work Offline" button to take the node offline, and a "Print" button to perform a multidimensional print.

Toolbar 122B provides a number of buttons for performing orientation functions such as switching cost centers, versions of the workbook and dimensions of the view of into the worksheet. Toolbar 122C is a formula toolbar that provides user 12 with an interface for creating and editing input formulas for multidimensional cells. Toolbar 122C includes formula display to display the formula of an associated multidimensional cell, a number of buttons for executing the multidimensional formulas, and a number of buttons for deleting the multidimensional formulas. User 12 may use toolbar 122C to execute a single multidimensional formula, all multidimensional formulas in a cube, or all multidimensional formulas of a model (e.g., all the cubes).

User interface 120 includes a number of tabs 124 toward the bottom of the workbook. In the example illustrated in FIG. 10, the tabs include a "Product Price and Cost" tab, an "Income Statement" tab, which is the current worksheet being viewed, an "Expenses" tab, as well as numerous other tabs. As described above, each of the tabs corresponds with a worksheet associated with a different data cube 36. Although not illustrated in FIG. 10, there are a number of worksheets hidden from user 12. Hidden worksheets do not have associated tabs and are inaccessible to typical users 12. As described above, the hidden worksheets are used to store input formulas and provide formatting for the worksheets of the Excel workbook.

The "Income Statement" worksheet illustrated in FIG. 10 is structured and presented to user 12 in zones 126A and 126B (collectively, "zones 126"). Zone 126A comprises a multidimensional zone that includes a plurality for multidimensional data cells and zone 126B comprises an Excel zone that includes multiple conventional Excel cells. Zones 126 are presented to user 12 using visual cues. In the example illustrated in FIG. 10, zones 126 are illustrated to user 12 using shading, text color, borders or the like. In particular, the multidimensional information zone, i.e., zone 126A, includes a number of multidimensional data cells that have gray backgrounds. The Excel data cells of zone 126B, on the other hand, have white backgrounds. In this manner, interface 120 presents the worksheet to user 12 in a manner that allows user 12 to easily distinguish between the zones. As described above, spreadsheet application 22 (FIG. 1) may have a different set of control rules for each of zones 126, such as different control rules regarding model changes (e.g., dropped or added items) and other interactions with the cells of zones 126.

Figure 11:
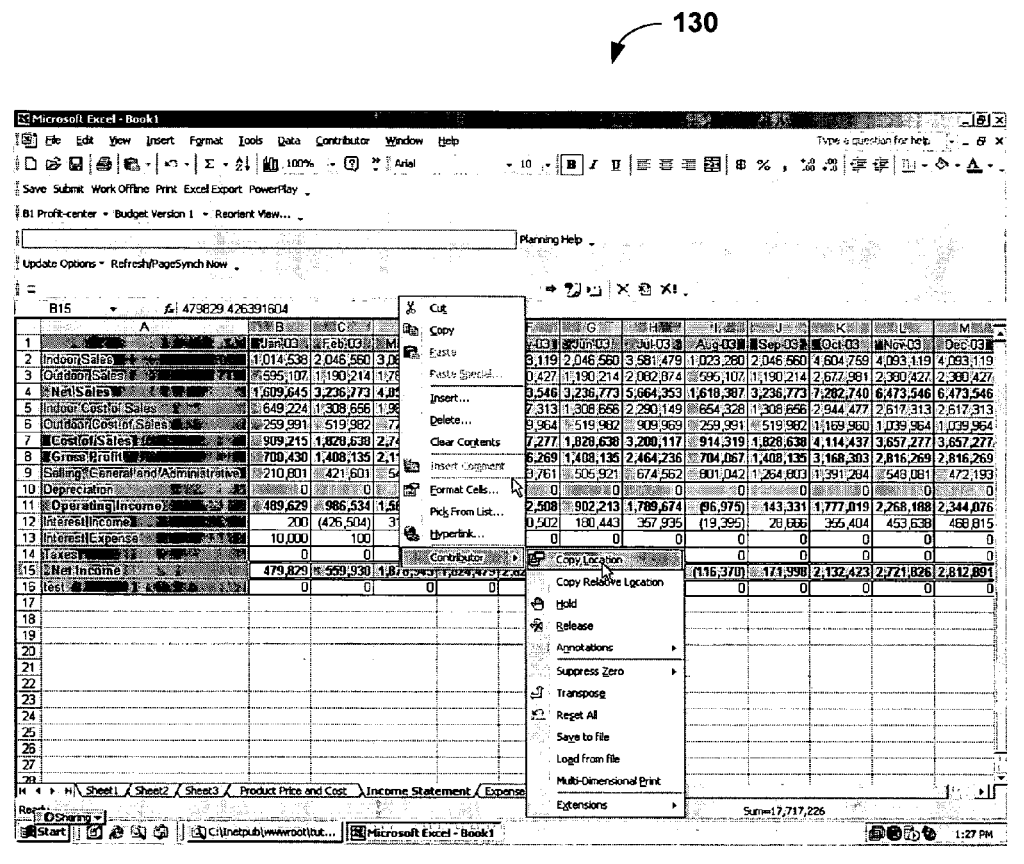

FIG. 11 is a screen shot of a user interface 130 presented to user 12 in response to a right-click of a mouse within the extended spreadsheet application 22. As illustrated in FIG. 11, user interface 130 includes a user-defined option in the right-click functionality called "Contributor." In some embodiments, the same functionality may also be found in a different menu location, such as the new main menu item 102 (FIG. 8). The right-click functionality includes a "Copy Location" and "Copy Relative Location" sub-item. These sub-items correspond to particular types of multidimensional referencing. For example, "Copy Location" corresponds to absolute referencing, while "Copy Relative Location" corresponds to indirect referencing.

Figure 12:
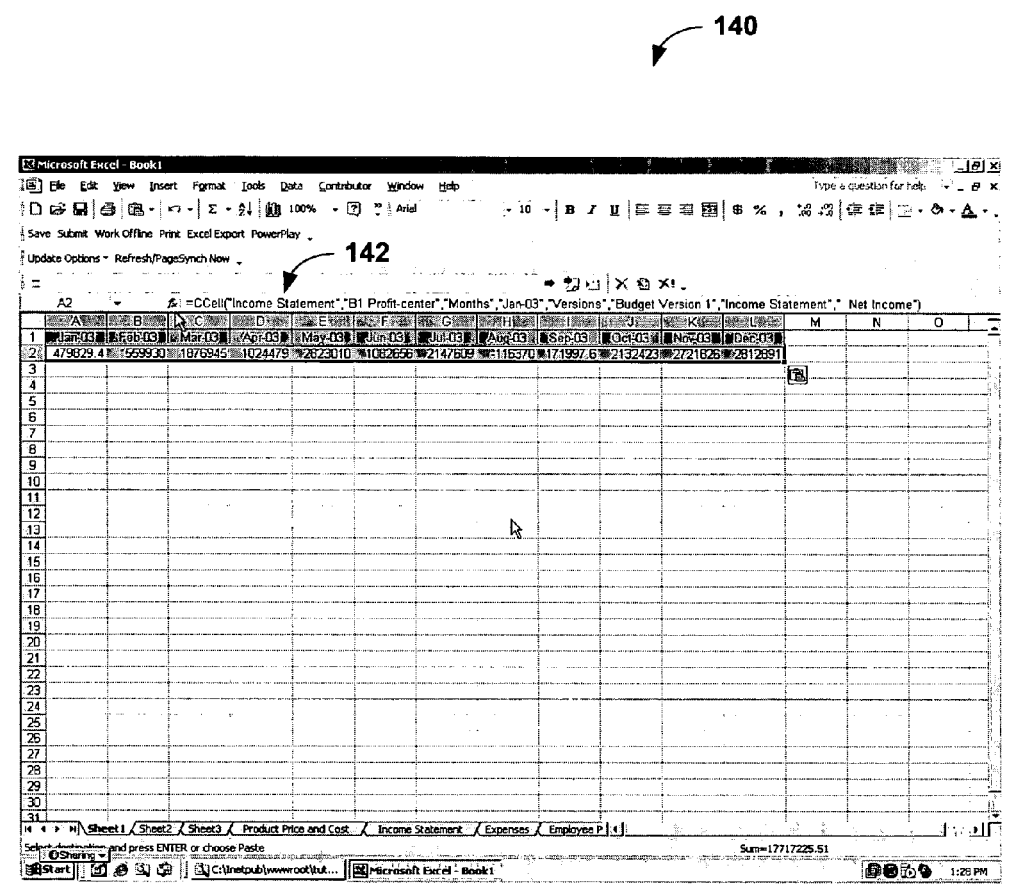

FIG. 12 is a screen shot of a user interface 140 that includes displays a multidimensional reference 142 associated with a multidimensional data cell. In the example illustrated in FIG. 12, the multidimensional reference is an absolute reference that determines the value displayed in the data cell located in column A, row 2. Multidimensional reference 142 begins with CCell, which identifies the data cell as a multidimensional data cell. Multidimensional reference 142 references data cube "Income Statement" for the current node "B1 Profit-center." Next, the reference specifies pairs of parameters. Each pair describes a dimension and an item along the dimension, respectively. In this example, the dimensions referenced by multidimensional reference 142 include "Months" and "Versions." The month and version selected are "Jan-03" and "Budget Version 1."

As described above, spreadsheet application 22 further supports indirect referencing that is dependent on the particular user using spreadsheet application. An indirect reference looks similar to the absolute multidimensional reference 142, except the parameter for specifying the node is left blank, i.e., "", which designates that the reference has not been associated with a particular model node. As a result, data is retrieved from whatever node is associated with the workbook.

Figure 13:
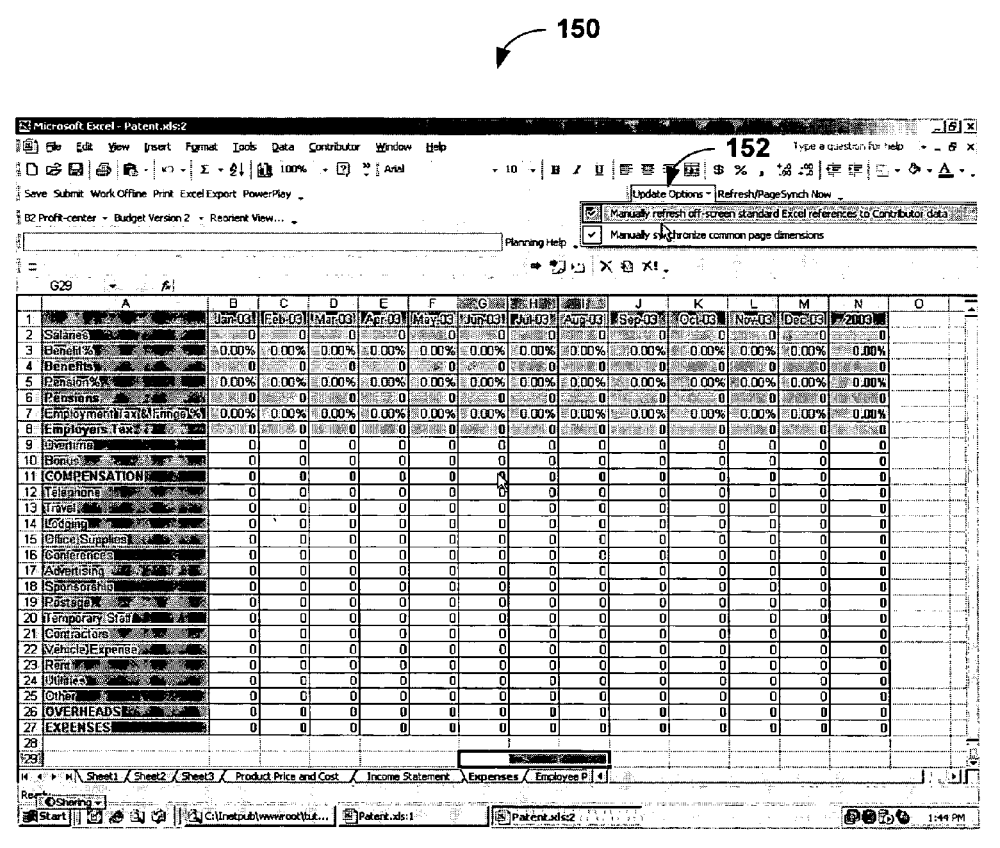

FIG. 13 is a screen shot of a user interface 150 in which user 12 is presented with a number of update options 152. Update options 152 include the capability to manually refresh off-screen Excel references to multidimensional data as well the capability to manually synchronize common page dimensions.

Various embodiments of the invention have been described. These and other embodiments are within the scope of the following claims.

The invention claimed is:

1. A method comprising:
downloading multidimensional data and at least a portion of an enterprise planning model from a multidimensional data store maintained by an enterprise planning system;
opening a template with a spreadsheet workbook associated with a particular node of the enterprise planning model, wherein one or more data cells of the template uses relative referencing to specify an item of a dimension of the data store without regard to a slice of the multidimensional data;
generating a spreadsheet for presenting the downloaded multidimensional data in accordance with the downloaded portion of the enterprise planning model by populating the data cells of the template with data located along the dimension referenced by the template based on a model slice for the node associated with the spreadsheet workbook; and
displaying the spreadsheet and the multidimensional data to a user with a spreadsheet application.

2. The method of claim 1, further comprising:
identifying one or more nodes on the enterprise planning model that are associated with user;
receiving input from the user selecting one of the nodes;
downloading the multidimensional data and the portion of the enterprise planning model based on the selected node;
generating the spreadsheet based on the multidimensional data and the portion of the enterprise planning model downloaded for the selected node.

3. The method of claim 2, further comprising:
associating the generated spreadsheet with the identified node of the enterprise planning model;
receiving planning data from the user via the spreadsheet;
updating the downloaded multidimensional data based on the planning data; and
synchronizing the multidimensional data maintained by the enterprise planning and the downloaded multidimensional data upon receiving a save command from the user.

4. The method of claim 1,
wherein displaying the spreadsheet comprises presenting the spreadsheet to have multiple zones of data cells, and
wherein a first zone includes at least one data cell associated with data from the multidimensional data store and a second zone includes at least one data cell associated with data maintained within the workbook.

5. The method of claim 4, wherein presenting the spreadsheet comprises displaying the zones using visual cues to identify the different zones of data cells.

6. The method of claim 5, wherein displaying the zones using visual cues comprises displaying each of the zones with one of a different background color, border, and text color.

7. The method of claim 4, further comprising controlling the first zone having at least one data cell associated with data from the multidimensional data store in accordance with a set of control rules to ensure the data integrity of the multidimensional data stored within the enterprise planning system.

8. The method of claim 1, further comprising receiving input from the user that defines an absolute reference tat references an item along a dimension of the data store for a particular node of the enterprise planning model.

9. The method of claim 1, further comprising receiving input from the user that defines an indirect reference that references an item along a dimension of the data store independent from a particular node of the enterprise planning model.

10. The method of claim 1, further comprising populating one or more multidimensional data cells of the spreadsheet from an external data store using an input formula.

11. The method of claim 10, further comprising presenting the user with a formula toolbar with which the user may interact to define the formula.

12. The method of claim 10, wherein the input formula references at least one of a second spreadsheet workbook or a third party system.

13. The method of claim 10, further comprising:
maintaining a hidden spreadsheet within the spreadsheet workbook; and
storing the input formula within the hidden spreadsheet.

14. The method of claim 10, further comprising executing the input formula in response to a command from the user.

15. The method of claim 1, further comprising:
receiving input from the user identifying dimensions of the multidimensional data store to present in the spreadsheet; and
reorienting the worksheet in accordance with the dimensions provided by the user.

16. The method of claim 1, further comprising:
receiving identification information from the user; and
logging the user into the enterprise planning system via the spreadsheet application using the identification information.

17. The method of claim 1, further comprising displaying to the user one of a user-defined main menu item and a user-defined toolbar for interacting with the multidimensional data store.

18. The method of claim 1, further comprising:
presenting the user with a list of nodes of an enterprise planning model for which the user is authorized;
receiving a selection of one of the nodes from the user; and
accessing the enterprise planning system to request the multidimensional data based on the selected node.

19. A system comprising:
an enterprise planning system that maintains multidimensional data associated with an enterprise planning session in accordance with an enterprise model;
a computing device coupled to the enterprise planning system via a network;
a workbook associated with a particular node of the enterprise model;
a template having one or more data cells that use relative referencing to specify an item of a dimension of the multidimensional data without regard to a slice of the multidimensional data; and a spreadsheet application executing on the computing device, wherein the spreadsheet application comprises:
an engine that communicates wit the enterprise planning session and loads a portion of the multidimensional data and at least a portion of the enterprise planning model on the computing device, and
a document management module that provides a structured representation of a spreadsheet based on the downloaded portion of the enterprise planning model for presenting the downloaded portion of the multidimensional data to a user,
wherein the document management module generates the representation of the spreadsheet by populating the data cells of the template with data located along the dimension referenced by the template based on a model slice for the node associated with the workbook.

20. The system of claim 19, wherein the computing device further comprises a calculation engine to locally update the portion of the multidimensional data on the computing device based on planning data received from the user.

21. The system of claim 19, wherein the document management module presents the spreadsheet to the user as a two-dimensional representation of the portion of the multidimensional data store.

22. The system of claim 19, wherein the spreadsheet application presents a spreadsheet to the user as part of a spreadsheet workbook.

23. The system of claim 19,
wherein document management module divides the spreadsheet workbook into zones, and
wherein a first zone includes at least one data cell associated with the multidimensional data and a second zone includes at least one data cell associated with other data maintained within the workbook.

24. The system of claim 23, wherein the spreadsheet application presents the zones to the user using visual cues to identify the data cells associated with the multidimensional data from the data cells associated with the other data.

25. The system of claim 24, wherein the spreadsheet application displays each of the zones with one of a different background color, border or text color.

26. The system of claim 19, further comprising a control module that includes interface elements for the spreadsheet application for interfacing with the user.

27. The system of claim 26, wherein the control module controls applies a set of rules to control input to the zone having multidimensional data cells.

28. The system of claim 19, wherein at least one data cell of the spreadsheet associated with the multidimensional data references a specific item along a dimension for a node of the enterprise planning model.

29. The system of claim 19, wherein at least one data cell of the spreadsheet includes an indirect reference that references an item along a dimension without specifying to a node of the enterprise planning model.

30. The system of claim 19, wherein at least one data cell of the spreadsheet associated with the data from the multidimensional data store is populated using an input formula.

31. The system of claim 28, wherein the document management module receives input from the user selecting one or more dimensions of the multidimensional data, and the document management module reorients the spreadsheet in accordance with the dimensions provided by the user.

32. The system of claim 30, wherein the spreadsheet application presents the user with a formula toolbar with which the user may interact to define the input formula.

33. The system of claim 30, wherein the input formula references at least one of a second spreadsheet workbook or a third party system.

34. The system of claim 30, wherein the spreadsheet application maintains a hidden worksheet and stores the input formula within the hidden worksheet.

35. The system of claim 30, wherein the spreadsheet application executes the input formula in response to a command from the user.

36. The system of claim 19, further comprising a control module that receives identification information from the user and logs the user into the enterprise planning system using the identification information.

37. The system of claim 36, wherein the control module retrieves a list of nodes of the enterprise planning module for which the user is authorized for presentation to the user, and directs the engine to load the portion of the multidimensional data and the portion of the enterprise planning model based on a selected one of the nodes.

38. The system of claim 19, wherein the spreadsheet application displays to the user one of a user-defined main menu item and a user-defined toolbar for interacting with the multidimensional data store.

39. A computer readable medium comprising instruction that cause a programmable processor of a computing device to:
download multidimensional data and at least a portion of an enterprise planning model from a multidimensional data store maintained by an enterprise planning system;
generate a spreadsheet for presenting the downloaded multidimensional data in accordance with the downloaded portion of the enterprise planning model by: (i) opening a spreadsheet workbook template with a workbook associated with a particular node of the enterprise planning model, wherein one or more data cells of a template uses relative referencing to specify an item of a dimension of the data store without regard to a slice of the multidimensional data, and (2) populating the data cells of the template with data located along the dimension referenced by the template based on a model slice for the node associated with the workbook; and
display the spreadsheet and the multidimensional data to a user with a spreadsheet application.

* * * * *

UNITED STATES PATENT AND TRADEMARK OFFICE
CERTIFICATE OF CORRECTION

PATENT NO. : 7,213,199 B2  Page 1 of 1
APPLICATION NO. : 10/965321
DATED : May 1, 2007
INVENTOR(S) : Humenansky et al.

It is certified that error appears in the above-identified patent and that said Letters Patent is hereby corrected as shown below:

Column 18, line 12 (claim 8), "reference tat" should read --reference that--

Column 19, line 5 (claim 19), "wit" should read --with--

Column 19, line 6 (claim 19), "session" should read --system--

Signed and Sealed this

Twenty-ninth Day of April, 2008

JON W. DUDAS
*Director of the United States Patent and Trademark Office*